United States Patent [19]
Biggers et al.

[11] Patent Number: 5,226,453
[45] Date of Patent: Jul. 13, 1993

[54] BALL VALVE

[75] Inventors: John C. W. Biggers; Henry G. Brock, both of Aspley, Australia

[73] Assignee: Cambri Pty. Ltd., Queensland, Australia

[21] Appl. No.: 951,496

[22] Filed: Sep. 25, 1992

[30] Foreign Application Priority Data

Oct. 2, 1991 [AU] Australia ............................... PK8677
Nov. 8, 1991 [AU] Australia ............................ 87087/91

[51] Int. Cl.⁵ ................................................ F16K 1/14
[52] U.S. Cl. ..................................... 137/801; 137/901; 251/88; 251/264
[58] Field of Search .................. 137/801, 901; 251/88, 251/264

[56] References Cited

U.S. PATENT DOCUMENTS

| | | | |
|---|---|---|---|
| 963,842 | 7/1910 | Williams | 137/901 X |
| 1,173,728 | 2/1916 | Milne | 137/901 X |
| 1,441,772 | 1/1923 | Wilson | 137/901 X |

FOREIGN PATENT DOCUMENTS 0110061 6/1984 European Pat. Off. .
430356 8/1967 Switzerland .

Primary Examiner—Gerald A. Michalsky
Attorney, Agent, or Firm—Panitch Schwarze Jacobs & Nadel

[57] ABSTRACT

A valve assembly for use in association with a water tap having a valve seat (17) located in a passageway between a fluid inlet (15) and a fluid outlet (16) and having an axially recessed spindle (18) adapted for movement toward and away from the valve seat, said valve assembly comprising a resiliently deformable spherical sealing member (11), and a plunger member (10) for moving said sealing member against said valve seat, said plunger member including a stem (14) for location within the spindle recess, and a helical spring (12) which extends between the valve seat and a portion of the tap through which the spindle extends.

4 Claims, 1 Drawing Sheet

BALL VALVE

TECHNICAL FIELD OF THE INVENTION

THIS INVENTION relates to valve assemblies and is particularly concerned with valve assemblies for use in common domestic, agricultural and commercial water taps. Accordingly, the invention will primarily be described in these contexts although it will be readily apparent to the skilled addressee that the invention has broader ramifications and may be readily modified to suit other applications. The following description is therefore not to be deemed limiting on the scope of the invention.

BACKGROUND OF THE INVENTION

Common domestic water taps comprise a tap body having a fluid flow pathway extending therethrough, a valve seat located intermediate the fluid flow pathway, a tap spindle moveable towards and away from the valve seat which includes an axial recess, and a tap head which connects to the tap body and which houses the tap spindle. The tap head includes an opening in the top through which an upper portion of the tap spindle extends and on which a handle is fitted to permit the tap spindle to be rotated in the tap head and thereby move either towards or away from the valve seat.

Valves which are commonly used with this type of tap are known as tap washers and comprise a disc-like seal which overlies the valve seat, and a stem which extends from the disc-like seal and locates within the tap spindle. Thus, movement of the tap spindle towards the valve seat causes the disc-like seal to be brought into engagement with the valve seat to thereby stop the flow of water through the tap body.

Such disc-like seals have a number of disadvantages, prime among which are their proclivity to rapid wear, leading to a relatively limited life span. Furthermore, it is quite common for particulate debris to trapped on the disc so that a firm sealing cannot be achieved and dripping occurs.

OBJECT OF THE INVENTION

It is therefore an object of the present invention to provide an alternative form of valve which is not subject to such wear and which obviates, or at least minimises, the problem of debris entrapment.

SUMMARY OF THE INVENTION

According to the present invention, there is provided a valve assembly for use in association with a tap having a valve seat located in a passageway between a fluid inlet and a fluid outlet and having an axially recessed spindle adapted for movement toward and away from the valve seat, said valve assembly comprising a resiliently deformable spherical sealing member, a plunger member for moving said sealing member against said valve seat, said plunger member including a stem for location within the spindle recess and a helical spring adapted to extend between said valve seat, and a portion of the tap through which said spindle extends, and in which said spherical sealing member is retained, wherein said helical spring is fractionally bigger in diameter than the diameter of the said spherical sealing member.

The use of a resiliently deformable spherical sealing member not only enables a tight seal with the valve seat to be achieved, but also ensures a new seating surface is presented by the spherical sealing member every time the valve is shut. This is effected by virtue of the spherical sealing member rotating upon being unseated, by the passage of water past it. Consequently, as a new seating surface is presented, wear is reduced to such an extent as to be negligible. In theory, such a sealing member could last the life of the tap without the need for replacement. Furthermore, entrapment of debris in the spherical sealing member is almost impossible because of the very small area of contact the spherical sealing member makes with the valve seat. Any debris which does happen to be trapped will more than likely not come into contact with the valve seat again but if it does happen to do so, any resultant discharge could be prevented by the simple expedient of opening and shutting the tap to enable the spherical sealing member to rotate to a new surface free of debris.

The main purpose of the helical spring is to align the spherical sealing member with the valve seat. This enables the use of a smaller size spherical sealing member than would otherwise be possible and gives a smoother surface for the spherical sealing member to rotate against. A smooth surface means that the spherical sealing member is not hindered in its rotation by the passing water when the valve is open.

The helical spring may lie within the inner or outer boundaries of the plunger member. Preferably, it lies within the inner boundaries of the plunger member. Furthermore, in such a situation it is required to be manufactured from a material which enables it to return to its original shape when the valve is opened, that is, when the plunger member is withdrawn in a direction away from the valve seat. A suitable material for this use is spring steel and a stainless steel helical spring is particularly preferred. However, Nylon (a Registered Trade Mark) or other high density plastics material may also be an appropriate material for such a spring. In order to ensure that the spherical sealing member rotates within the helical spring in an unhindered manner, it is suitably dimensioned so as to be fractionally smaller in diameter than the diameter of the spring. For a conventional domestic 12 mm water tap, the spherical sealing member may have a diameter of 13–16 mm, most preferably about 14.6 mm, and the spring will have a fractionally larger diameter of 16–20 mm, most preferably about 16 mm. Even more preferably, the spring will taper in diameter from one end to the other so as to be slightly wider at the location where it lies adjacent the valve seat than at the location where it lies adjacent the plunger member. In the preferred example, the spring may be 16 mm at one end, and 20 mm at the other. The uncompressed length of such a spring may be about 14 mm.

The use of a spring in the valve assembly has the additional advantage of reducing the effects of "water hammer" within the water line to which the tap is fitted, although it is noted that such effects are countered to a certain degree by the resilient nature of the sealing member.

To enable even smoother rotation of the spherical sealing member, a low friction lining can be included within the spring. Such a lining may be a mesh of fused plastics material such as polypropylene. The mesh sizes will be chosen so as not to significantly impede the flow of water therethrough yet be sufficiently close to provide a "surface" for the spherical sealing member to move against without hindrance.

The resiliently deformable spherical sealing member can be manufactured from a wide range of materials which show sufficient resiliency to form a fluid-tight seal with the valve seat. That is, the material must be able to deform upon compression and return to its original configuration upon the compressive force being removed, while at the same time not being too deformable which could lead to retention within the valve seat. Suitable materials are natural and synthetic rubbers with appropriate additives, plastics materials, and composites of rubber and/or plastics with other natural and/or synthetic products.

It is also envisaged that sealing members having a resiliently deformable outer cover with a solid core, such as metal, wood or plastics material, may be used with suitable effect.

The particular material selected as the resiliently deformable component will also depend upon the nature of the fluid passing through the tap. In the majority of intended instances this will be water and the material should therefore be non toxic, and in the case of domestic water supplies should additionally meet food grade standards. The density of the spherical sealing member should also be selected according to the fluid pressure. Thus, high fluid pressures enable the use of higher density sealing members than low fluid pressures do. In he case of the domestic water supply, a suitable density is between 1 and 2 gm/cc, most preferably about 1.7 gm/cc.

A particularly preferred resiliently deformable spherical sealing member is one which is manufactured from a natural rubber material reinforced with carbon black and containing mineral fillers of china clay and zinc oxide. Such a material is produced by Narm Rubber Product, Qld, Australia and has the reference 047. It is a black compound having a Shore A hardness of 85°–90°, a density of 1.69 gm/cc, a tensile strength of 8.0 MPa minimum, and an elongation at breaking of 130% minimum. The material is basically classed as a non-toxic food grade compound.

The plunger member can assume any configuration which enables it to be guided toward and away from the valve seat and to depress the spherical sealing member onto the valve seat. Suitably, the plunger member has a cap on one end which accommodates a portion of the spherical sealing member so as to ensure correct alignment with the valve seat. The cap may be formed with a conical or flat inner surface and is preferably cylindrical so that it can be snugly accommodated within the tap housing to ensure unhindered movement in the same axial direction as the tap spindle. The stem on the cap will be located on the central axis of the cap and be of a length commensurate with the stem on a conventional tap washer.

The plunger member may be manufactured from a wide range of materials including plastics materials such as Nylon (a Registered Trade Mark), non-corrosive metals such as brass and stainless steel, and composite materials.

BRIEF DESCRIPTION OF THE DRAWINGS

A preferred embodiment of the invention will now be described with reference to the accompanying drawings, in which.

DETAILED DESCRIPTION OF THE INVENTION

Figure 1:
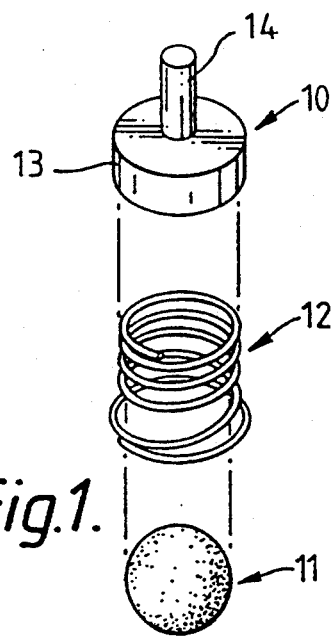
FIG. 1 is an exploded isometric view of a valve assembly according to the present invention.

In all the drawings, like reference numerals refer to like parts.

Referring firstly to FIG. 1, the valve assembly depicted is adapted for use with a domestic half inch water tap and comprises a plunger 10, a resiliently deformable spherical sealing member 11 and a spring 12.

The plunger consists of a cylindrical cap 13 with an integral axially located solid stem 14 formed from high density polypropylene. The diameter of the cap is 18 mm and its wall height is 6 mm. The stem is 10 mm in length and 4 mm in diameter.

The resiliently deformable spherical sealing member 11 is manufactured solely from compound reference 047 referred to in the preceding description. The spherical sealing member has a diameter of 14.6 mm.

The spring 12 is a stainless steel compression spring having a coil length of 14 mm in its relaxed state, an upper diameter of 16 mm and a lower diameter of 20 mm. The spring 12 is adapted for retention within the cylindrical cap 13.

Figure 2:
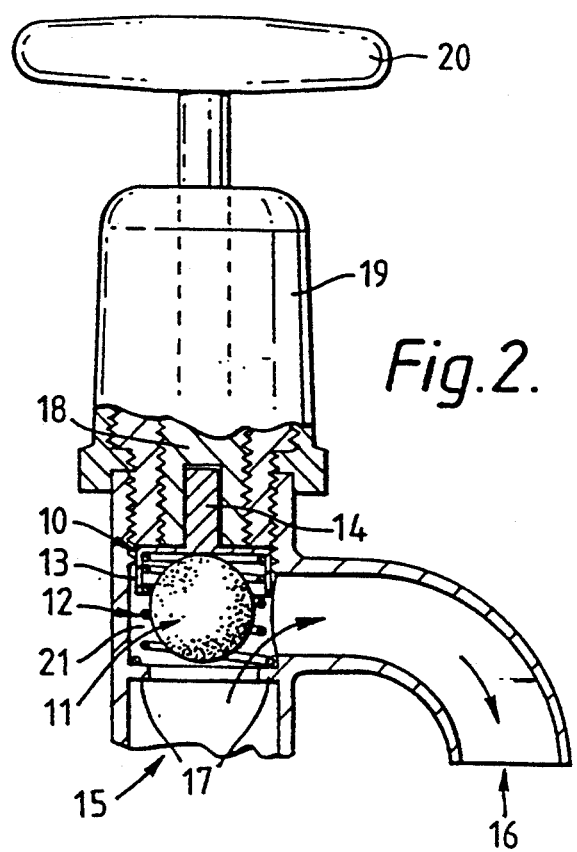
FIG. 2 is a cross-sectional view of an open tap incorporating the valve of FIG. 1.
Figure 3:
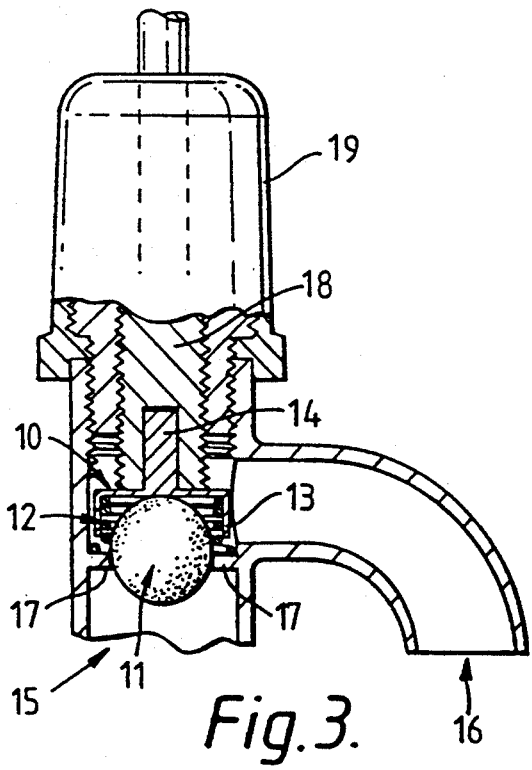
FIG. 3 is a cross-sectional view of a shut tap incorporating the valve of FIG. 1.

Turning to FIGS. 2 and 3, the valve assembly is shown housed within the tap. The tap includes a water inlet 15, a water outlet 16, a valve seat 17, a spindle 18, a tap head 19 and a handle 20.

As can be seen, the spring 12 is housed snugly within the fluid passageway 21 and rests on the valve seat 17. The resiliently deformable spherical sealing member 11, is housed within the confines of the spring 12 and is retained beneath the plunger 10. The stem 14 of the plunger extends into an axial recess formed in the spindle 18 for retention in a conventional manner.

In operation, water flows through the open tap in the direction of the solid arrows shown in FIG. 2. The pressure of the water is such as to raise the spherical sealing member 11 out of the way of the fluid passageway to enable smooth unimpeded flow.

Upon turning the tap off by rotating handle 20, the spindle 18 with associated plunger 10, depresses the spring 12 and urges the spherical sealing member 11 downwardly against the valve seat 17. FIG. 3 shows the maximum amount by which the spherical sealing member can be depressed with the spring 12 fully compressed. However, in practice it is not necessary to fully compress the spring to achieve complete sealing since the diameter of the spherical sealing member is appreciably greater than the width of the compressed spring. The depicted shut-off point merely illustrates the situation of overtightening of the tap and indicates that such overtightening does not give rise to the spherical sealing member 11 being stuck within the valve seat.

We claim:

1. A valve assembly for use in association with a tap having a valve seat located in a passageway between a fluid inlet and a fluid outlet and having an axially recessed spindle adapted for movement toward and away from the valve seat, said valve assembly comprising a resiliently deformable spherical sealing member, a plunger member for moving said sealing member against said valve seat, said plunger member including a stem for location within the spindle recess, and a helical spring adapted to extend between said valve seat and a portion of the tap through which said spindle extends, and in which said spherical sealing member is retained, wherein said helical spring is fractionally bigger in diameter than the diameter of the said spherical sealing member.

2. A valve assembly as claimed in claim 1 wherein the plunger member comprises a cylindrical cap having an axial stem extending from an end wall.

3. A valve assembly as claimed in claim 2, wherein said cylindrical cap is adapted to retain an end of the helical spring.

4. A valve assembly as claimed in claim 1 wherein said resiliently deformable spherical sealing member is manufactured from a natural rubber composite material.

* * * * *